US008875010B1

(12) United States Patent
Balev (10) Patent No.: US 8,875,010 B1
(45) Date of Patent: *Oct. 28, 2014

(54) SYSTEMS AND METHODS EMPLOYING MULTIPLE CROP AREAS

(75) Inventor: Dimcho Balev, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 733 days.

This patent is subject to a terminal disclaimer.

(21) Appl. No.: 12/898,766

(22) Filed: Oct. 6, 2010

Related U.S. Application Data

(63) Continuation of application No. 11/676,158, filed on Feb. 16, 2007, now Pat. No. 7,831,901.

(51) Int. Cl.
 *G06F 17/00* (2006.01)
(52) U.S. Cl.
 USPC .......................................................... 715/211
(58) Field of Classification Search
 CPC .............. H04N 5/2628; G06T 2210/22; G06F 3/04845
 USPC ........................... 715/246, 209, 211; 382/282
 See application file for complete search history.

(56) References Cited

U.S. PATENT DOCUMENTS

| | | | |
|---|---|---|---|
| 5,477,241 A | 12/1995 | Higgins et al. | |
| 5,619,738 A | 4/1997 | Petruchik et al. | |
| 5,729,673 A | 3/1998 | Cooper et al. | |
| 5,861,906 A | 1/1999 | Dunn et al. | |
| 6,006,231 A | 12/1999 | Popa | |
| 6,078,936 A | 6/2000 | Martin et al. | |
| 6,297,845 B1 | 10/2001 | Kuhn et al. | |
| 6,326,979 B1 | 12/2001 | Radeztsky | |
| 6,738,079 B1 | 5/2004 | Kellerman et al. | |
| 6,741,270 B1 | 5/2004 | Rzepkowski et al. | |
| 7,065,716 B1 | 6/2006 | Rzepkowski et al. | |
| 7,142,225 B1 | 11/2006 | Boler et al. | |
| 7,646,433 B2 | 1/2010 | Chen et al. | |
| 7,831,901 B1 | 11/2010 | Balev | |
| 2002/0126142 A1 | 9/2002 | Hodgkinson | |
| 2003/0113035 A1 | 6/2003 | Cahill et al. | |
| 2003/0139840 A1 | 7/2003 | Magee et al. | |
| 2003/0214603 A1 | 11/2003 | Manning | |
| 2004/0125148 A1 | 7/2004 | Pea et al. | |
| 2005/0034068 A1 | 2/2005 | Jaeger | |
| 2005/0036708 A1 | 2/2005 | Boll | |
| 2005/0094205 A1 | 5/2005 | Lo et al. | |
| 2005/0264583 A1 | 12/2005 | Wilkins | |
| 2006/0015804 A1 | 1/2006 | Barton et al. | |
| 2006/0069988 A1 | 3/2006 | Bailey | |
| 2006/0109282 A1 | 5/2006 | Lin | |
| 2006/0170669 A1 | 8/2006 | Walker et al. | |
| 2007/0165034 A1 | 7/2007 | Mielke | |
| 2009/0307583 A1 | 12/2009 | Tonisson | |

OTHER PUBLICATIONS

Microsoft Publisher (C) 2003 Screenshot taken Nov. 9, 2009.
Pixel Ruler v3.1 mioplanet.com, Dec. 12, 2006.
Final Cut Pro: Using square or non-square pixels when creating graphics, May 6, 2004.

(Continued)

*Primary Examiner* — Adam M Queler
(74) *Attorney, Agent, or Firm* — Kilpatrick Townsend & Stockton LLP (57) ABSTRACT

A system comprises an editable electronic document and a plurality of selectable sub areas in the document, each independently actionable for cropping.

14 Claims, 4 Drawing Sheets

(56) References Cited

OTHER PUBLICATIONS

Scott Kelby, Super Size Me: resizing and cropping, Jan. 16, 2006, 19 pages.
Antony Bolante Managing Footage in Adobe After Effects, Sep. 23, 2005, 37 pages.
Dis Dat Designs debbieT's Paint Shop Pro Tutorials PSP 7 Cropping, Resizing, and Exporting Digital Images for PSP Beginners, 2006, 4 pages.
Brian Huculak, Cropping Photos:Every Picture tells a story, Jan. 18, 2006, 9 pages.
Rick Gerard, Understanding the use of square vs non-square pixels in AE, 2001, 9 pages.
Adobe Photoshop CS2 Classroom in a Book, published May, 24, 2005, pp. 10, 90-92, 279.
"Adobe Design Center Tutorial Using Photoshop selection tools", available at http://adobe.com, Oct. 29, 2003, pp. 1-3, last accessed Feb. 15, 2007.
Adobe Photoshop CS2 User Guide, 2005, pp. ii, 22, 223-249, 253-258, 333-380.
Microsoft Office Publisher, Save a publication as a Word document, Microsoft Office Online, © 2009 http://office.microsoft.com/en-us/publisher/HP011667581033.aspx.
"PhotoStudio Manual for Windows", ArcSoft Photo Studio, ArcSoft, Inc. pp. 1-3, pp. 1-38, accessed Feb. 15, 2007.
Virtuoso® Layout Editor User Guide, Product Version 5.0, © 1990-2003 Cadence Design Systems, Inc. Chapter 6 http://jas.eng.buffalo.edu/courses/ee549/cadence/virtuosoDoc/titlecopy .html Jun. 2003.
Rose, Carla "Making Selections in Photoshop CS2", available at http://www.quepublishing.com, Jun. 15, 2005, pp. 1-3, last accessed Feb. 15, 2007.
Tally, Taz "Crop Tool Capers", available at http://www.planetphotoshop.com, Jun. 20, 2006, pp. 1-4, last accessed Feb. 15, 2007.
Weiser, Jeri, "Publisher 2003: Working with Graphics, UWEC", Archived Jan. 6, 2005, Last updated Aug. 11, 2004 http://www.uwec.edu/Help/Publisher03/wrkgraph.htm.
Adobe Photoshop© CS2 User Guide, 2005, pp. ii, 22, 223-249, 253-258, 333-380.
U.S. Appl. No. 11/670,909, filed Feb. 2, 2007.
Office Action dated May 11, 2010 in related U.S. Appl. No. 11/670,909.
Office Action dated Nov. 16, 2009 in parent U.S. Appl. No. 11/676,158.
Notice of Allowance dated Jun. 29, 2010 in parent U.S. Appl. No. 11/676,158.
Notice of Allowance dated Aug. 9, 2010 in parent U.S. Appl. No. 11/676,158.
Notice of Allowance dated Aug. 17, 2010 in parent U.S. Appl. No. 11/676,158.
Notice of Allowance dated Jul. 29, 2010 in parent U.S. Appl. No. 11/676,158.
Non Final Office Action in related U.S. Appl. No. 11/670,909 dated May 21, 2013, 23 pages.
Final Office Action in related U.S. Appl. No. 11/670,909 dated Jan. 2, 2014, 17 pages.
Notice of Allowance in related U.S. Appl. No. 11/670,909 dated Apr. 16, 2014, 9 pages.

SYSTEMS AND METHODS EMPLOYING MULTIPLE CROP AREAS

CROSS-REFERENCE TO RELATED APPLICATIONS

This application is a continuation application of U.S. Ser. No. 11/676,158 filed Feb. 16, 2007, now allowed, the contents of which are incorporated herein by reference.

This application is related to U.S. patent application Ser. No. 11/670,909, filed Feb. 2, 2007, entitled, "METHODS AND SYSTEMS FOR DISPLAYING FORMAT PROPERTIES OF CROP AREAS," the disclosure of which is hereby incorporated by reference herein.

TECHNICAL FIELD

This disclosure is related to graphics programs and, more specifically, to cropping features in such programs.

BACKGROUND OF THE INVENTION

Various computer programs for creating, editing, and exporting artwork are on the market today. Examples include ILLUSTRATOR® and PHOTOSHOP®, both from Adobe Systems Incorporated of San Jose, Calif., and PHOTOSTUDIO™, available from ArcSoft, Inc.

Crop operations are frequently performed by users of such products. Traditional cropping usually includes placing a rectangular cropping tool around a desired art object and then selecting a crop operation, which then deletes the area around the desired art object and allows the selected portion to be exported for another use. One such use for cropping is to create appropriately-sized art portions for one or more downstream formats (e.g., video, etc.). Thus, if a user wants to export art to a video editor, the user crops a portion that is shaped according to the dimensions of the video format.

A problem arises when a user desires to export the same art to a variety of different formats. Prior art graphics programs usually allow only one crop area per document. Thus, the user must save at least one document per output format and then crop each document separately to create the desired output in each format. Opening and closing multiple documents takes time, creates file clutter, and is inefficient. Further, the user must make edits to the different documents if the user desires to edit the art after the documents are created.

Another prior art system includes a polygonal selection tool and a crop tool that can work together with the selection tool. A user can select an arbitrary group of simple shapes like rectangles and ellipses and create a complex, often non-contiguous selection. Then the user activates the crop tool, and it cuts the area outside the selection. In one example, a system allows a user to create, add, and subtract areas from to the total selection area. There is no information kept of multiple crop areas. In fact, the multiple selections act as a single, complex crop area. This is further illustrated by the fact that when the user clicks over the selection and drags, it moves the whole selection.

Currently, there is no product available that allows a user to create multiple, independent crop areas in the same document. Moreover, there is no product currently available that allows a user to export the same piece of art multiple times from a single document.

BRIEF SUMMARY OF THE INVENTION

Various embodiments of the invention are directed to systems, methods, and computer program products to create multiple, independent crop areas on a single document. For instance, one embodiment allows a user to create multiple, even overlapping, crop areas. Each of the crop areas is independently actionable for cropping. Thus, in one example, a user can select and manipulate each of the crop areas independently and also perform crop operations on a given area without affecting the other crop areas of the document. In various embodiments, the different crop areas are independent in nearly aspect, with differing positions, sizes, aspect ratios, and the like.

One specific example provides a mode wherein a single crop area is shown at a time and another mode wherein multiple crop areas are shown on the document. The user can easily switch between the modes. Further, when two or more crop areas overlap (as in a scenario when a user crops the same piece of art for different formats), the user can click on the overlap region to iterate through the crop areas.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

DETAILED DESCRIPTION OF THE INVENTION

Figure 1:
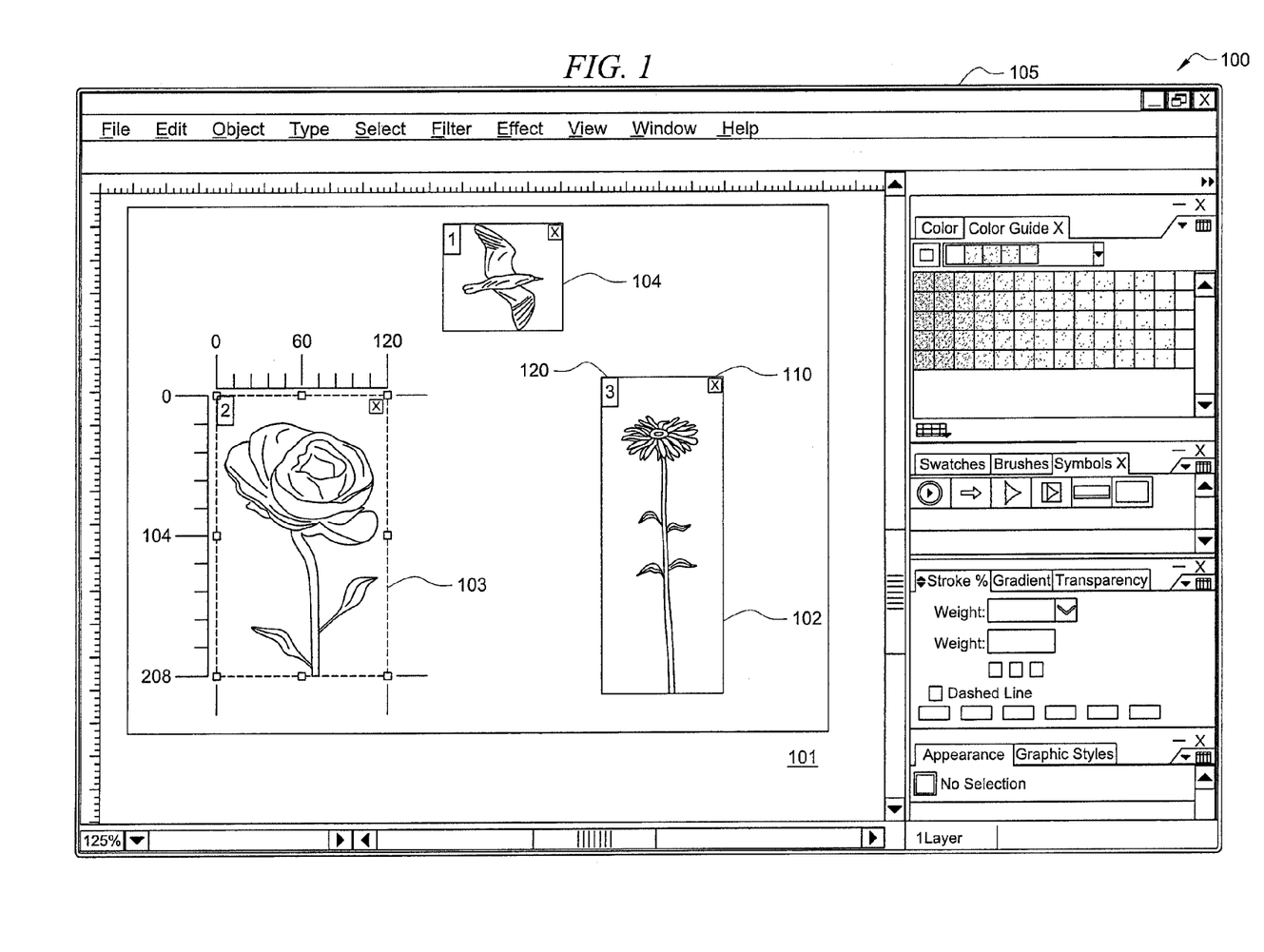
FIG. 1 is an illustration of an exemplary system adapted according to one embodiment of the invention.

FIG. 1 is an illustration of exemplary system 100 adapted according to one embodiment of the invention. System 100 includes electronic document 101 in user interface 105. Electronic document 101 includes crop areas 102-104, each of which are independently actionable for cropping.

Different techniques for cropping can be accommodated by various embodiments. In some embodiments, cropping does not result in a portion of document 101 being deleted. Instead, the area inside a given crop area is exported or otherwise saved while the document is left looking more or less the same. This type of cropping is non-destructive, whereas traditional cropping deletes portions of the document outside of a given crop area. Since embodiments of the invention support multiple crop areas, those embodiments are generally more adaptable for non-destructive cropping. Traditional cropping can also be accommodated by various embodiments, for example, by allowing it to be specially selected when a single crop area is in the document or by simply allowing other crop areas to be destroyed. As shown in FIG. 1, other parts of electronic document 101 that are not in one of areas 102-104 are masked, though not necessarily deleted.

System 100 allows a user to select crop areas (in this case, area 103 is selected) for editing and performing crop operations. Selecting may be accomplished by, for example, moving a cursor over a crop area and clicking with a mouse, using a drop down menu, hitting a shortcut key, or the like. The actual cropping instruction can be given similarly for a given crop area.

Since each of areas 102-104 is independently actionable for cropping, a crop operation for one of the areas does not necessarily cause any of the other areas to be cropped. For example, crop area 103 is selected in system 100, and a user may instruct system 100 to perform a cropping operation on area 103 without cropping areas 102 or 104. In some embodiments, crop areas 102-104 are independent in almost all respects, such that they may be independently edited, selected, and exported and also have different characteristics (e.g., size, pixel aspect ratio, and the like).

Figure 2:
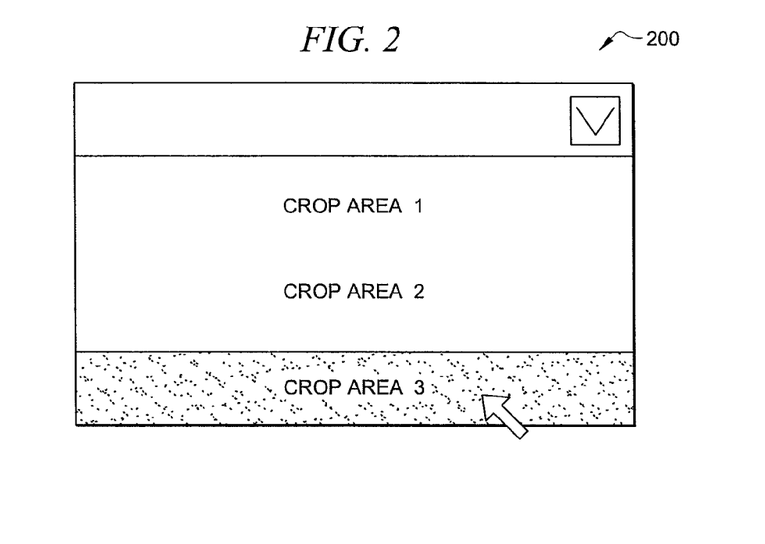
FIG. 2 is an illustration of an exemplary pull-down menu adapted according to one embodiment of the invention.

A given system according to one or more embodiments may include various features for a user's convenience. For example, in system 100, each of crop areas 102-104 includes button 110 that allows a crop area to be closed, and index 120, identifying a given crop area (in this case, by number). Index 120 can be used in a variety of ways, including identifying crop area 102 in an interface that allows selection of crop areas, such as a pop-up print or export dialog (not shown), a pull down menu (e.g., menu 200 of FIG. 2), or the like.

System 100 is exemplary, as other systems exist and are within the scope of the invention. For example, other embodiments may include more or fewer crop areas, may allow more than one crop area to be selected at a given time, may add or delete various features, and the like, as long as those embodiments provide for a plurality of independently actionable document areas for cropping.

Figure 3:
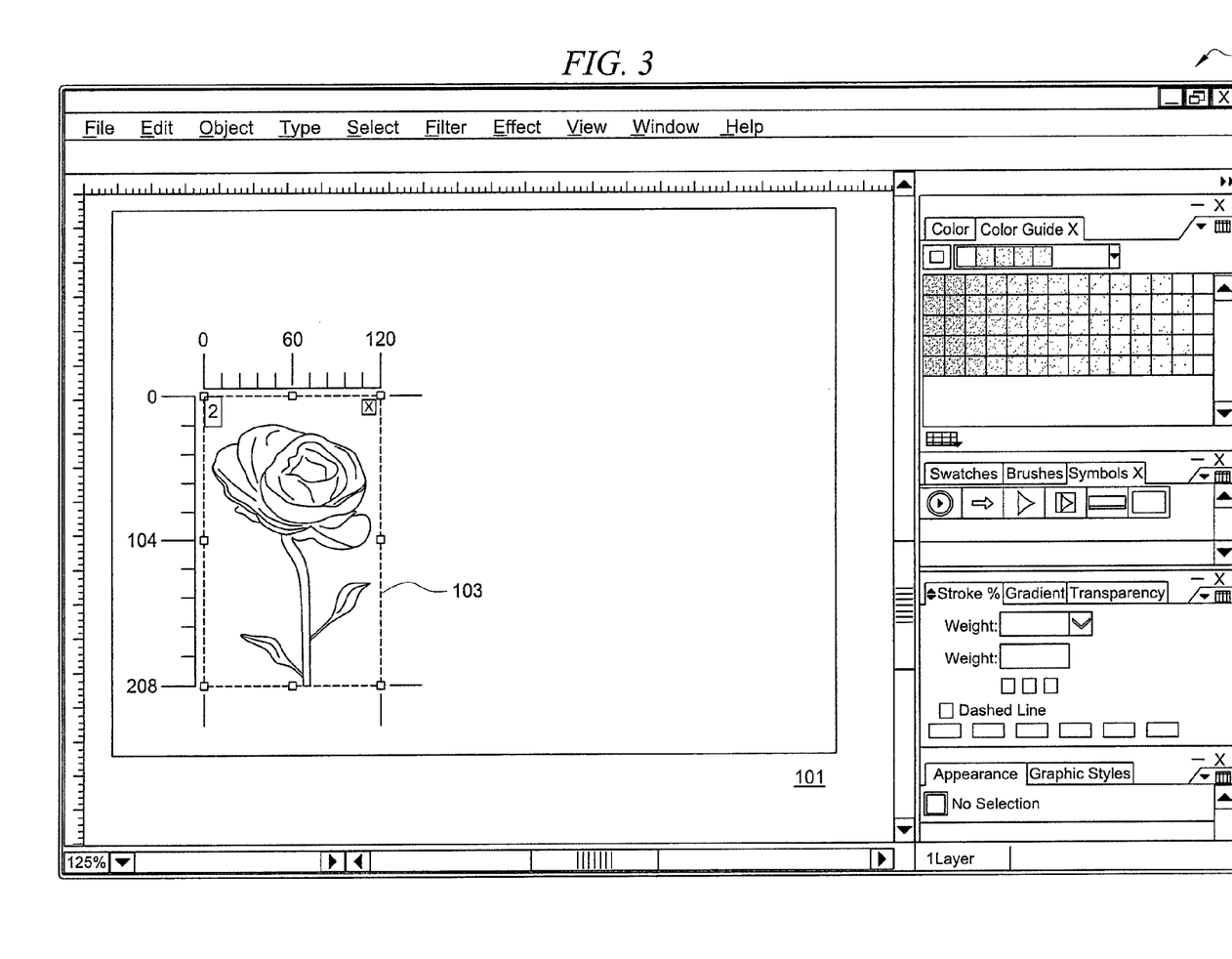
FIG. 3 is an illustration of system 100 (FIG. 1) in a mode different from that shown in FIG. 1.

FIG. 3 is an illustration of system 100 in a mode different from that shown in FIG. 1. In this example, system 100 includes at least two modes—a first mode wherein only active crop areas are shown and a second mode in which more than just the selected crop area is shown. FIG. 3 is an example of system 100 in the first mode, wherein only crop area 103 is shown because it is the crop area that is currently selected (i.e., active). FIG. 1 depicts the second mode wherein unselected crop areas 102 and 104 are shown in addition to selected crop area 103. Modes can be switched, for example, by a shortcut keystroke, a menu, a toolbar button, or the like, with the crop areas smoothly fading in and out.

Allowing users to switch between modes may provide one or more advantages. For example, displaying many crop areas on a document may begin to seem like clutter to a user, especially when the user's attention is directed to one crop area at a time. Accordingly, the user may prefer to have the other crop areas not displayed, at least when focused on a single crop area. However, when the user desires to view more than one crop area at a time, the user has that option.

Various embodiments of the invention may find use in one or more common scenarios during the creation and exporting of artwork. In one scenario, a user desires to export the same piece of art to a variety of applications that use different aspect ratios (e.g., pixel aspect ratios, screen aspect ratios). For example, there are many different video, print, and web formats that differ with regard to aspect ratio. A user may desire to export the same art to two or more applications that employ different aspect ratios. Various embodiments of the invention allow the user to create different and independent crop areas for each the formats.

Figure 4:
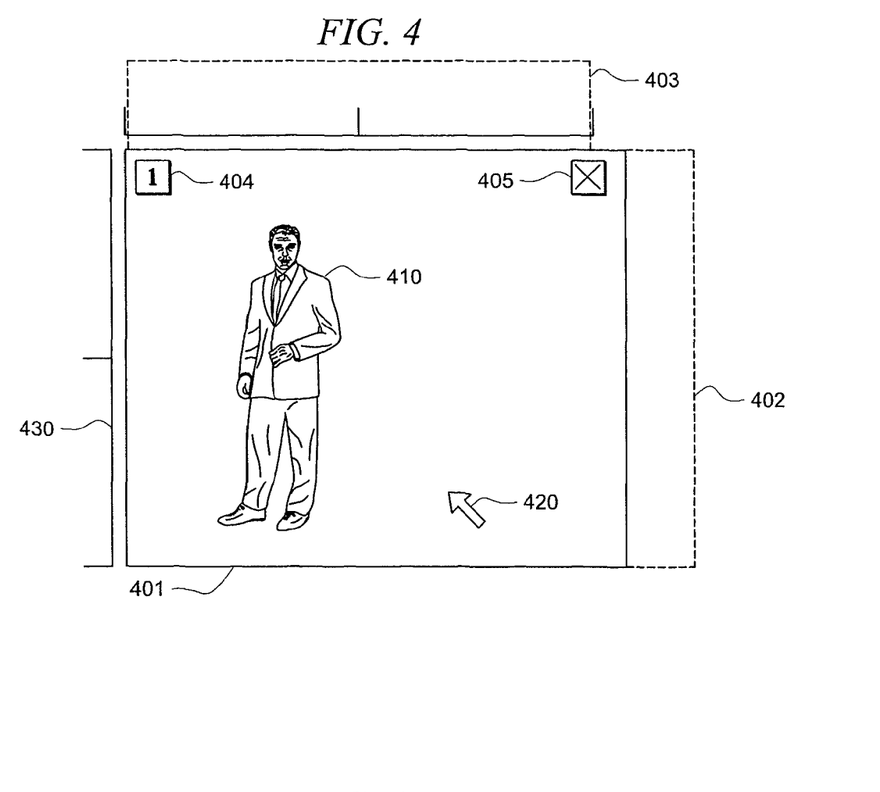
FIG. 4 is an illustration of an exemplary system adapted according to one embodiment of the invention.

FIG. 4 is an illustration of exemplary system 400 adapted according to one embodiment of the invention. System 400 includes three overlapping, independent crop areas 401-403 that are made to crop the same piece of artwork 410. Crop area 401 may correspond, e.g., to a standard television format with a pixel and screen aspect ratio of 4:3. Crop area 402 may correspond to, e.g., High Definition Television Widescreen format with a pixel and screen aspect ratio of 16:9. Additionally, crop area 403 may correspond to, e.g., a print format with aspect ratios of 1:1. As shown in FIG. 4, crop area 401 is selected and active and is denoted by solid borders, rulers 430, index 404, and button 405.

Should the user desire to select one of the other crop areas 402, 403, the user can move cursor 420 over the desired area and select (e.g., perform a mouse click). If cursor 420 is over an area with overlapping crop areas, a series of selections can cycle through crop areas 401-403. For example, the user can place cursor 420 as shown in FIG. 4 and select, and system 400 will make crop are 401 inactive while making crop area 402 active. Another selection by the user inactivates crop area 402 and activates crop area 403 (and yet another selection returns to the scenario shown in FIG. 4 wherein crop area 401 is active). Although not shown in SYSTEM 400, other embodiments can have more than one active crop area at a given time.

In system 400, active crop areas can be edited, manipulated, and cropped, while inactive crop areas are simply displayed. Thus, a user may select crop area 401 and perform editing, manipulating, or cropping operations thereon and then move on to crop areas 402 and 403. In this way, a user can export artwork to a plurality of formats all from the same document.

Prior art solutions would generally require a user to copy artwork 410 into several documents and separately crop from each one. System 400 provides advantages over such prior art systems. For instance, it is generally more efficient and convenient for a user to work from the same document rather than having to close one document and open another to work with the same piece of artwork. Further, a user can know which crop areas have been created and which still have yet to be created by looking at the same document, thereby eliminating confusion. Moreover, overlapping crop areas 401-403 give the user a way to see the relative dimensions of crop areas 401-403 as the user works.

While system 400 is shown with three overlapping crop areas, various embodiments are not limited to any particular number of crop areas that can be shown on the same document or overlap. Moreover, selecting and activating crop areas with a cursor is only one way to perform such function. Other techniques exist (e.g., selecting from a drop-down menu) and are within the scope of various embodiments.

Figure 5:
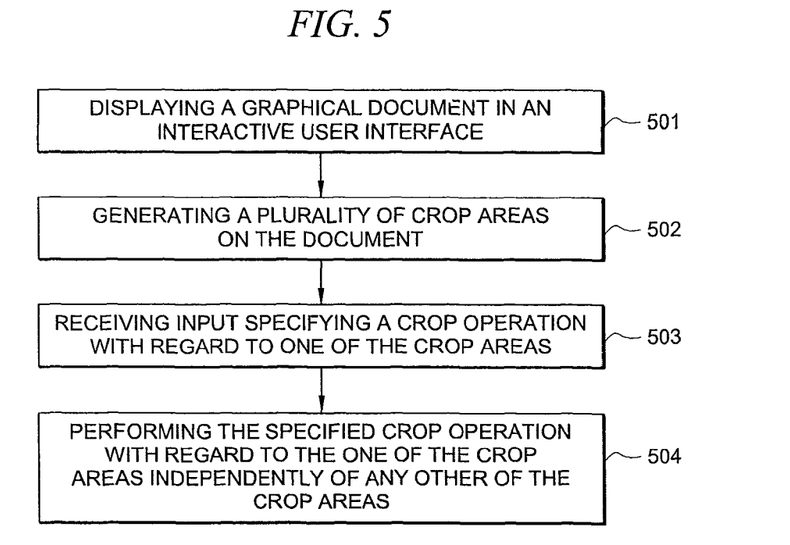
FIG. 5 is an illustration of an exemplary method adapted according to one embodiment of the invention.

FIG. 5 is an illustration of exemplary method 500 adapted according to one embodiment of the invention. Method 500 may be performed, e.g., by a computer executing instructions in a software program.

In step 501, a graphical document is displayed in an interactive user interface. For example, a document with a piece of artwork (such as artwork 410 of FIG. 4) is displayed by an "intelligent pallet" program that allows for creating, editing, and exporting of graphics.

In step 502, a plurality of crop areas are generated on the document. For example, a user may create several crop areas and may even create overlapping crop areas. In this example, at least one of the crop areas is independent and can be edited, manipulated, and cropped separately from the other crop areas. In some embodiments, all of the crop areas are independent of each other.

Some embodiments of the invention may include multiple viewing modes, wherein one or more of the modes displays more than one crop area on the document at a time and another of the modes displays only one crop area at a time. Method 500 can accommodate such modes, as it is not required (in this example) that all crop areas on the document be visible at all times.

There are various ways of creating crop areas in a document. In one example, the crop areas each include a plurality of associated properties that are saved in the data of the document. The properties may include, for example, dimensions, pixel aspect ratio, position, index number, and the like. Since each crop area has its own associated properties, each of the crop areas is similar to an independent object.

It may be possible in some embodiments to generate subsequent crop areas so that they inherit properties of previously-generated crop areas. For instance, a user may specify that a crop area is created to crop a particular piece of art and that the crop area should have crop area rulers (e.g., in FIGS. 1 and 3) and a specific pixel aspect ratio. Then, the next time the user creates a crop area, the new crop area has crop area rulers and the same pixel aspect ratio, unless the user specifies otherwise.

In step 503, input is received specifying a crop operation with regard to one of the crop areas. For example, a user may give a command to perform the crop operation by using a shortcut key, selecting a button on a toolbar, or the like.

In step 504, the specified crop operation is performed with regard to the one of the crop areas independently of any other of the crop areas. In this example, the crop area is independently croppable, and its crop operation is performed without regard to the existence of any of other crop area.

Method 500 is shown as a series of discrete steps. However, other embodiments of the invention may add, delete, repeat, modify and/or rearrange various portions of method 500. For example, steps 503 and 504 may be repeated for multiple ones of the crop areas generated in step 502. In some embodiments, it is possible to have two or more crop areas active in a document at a given time and even to crop those different crop areas at the same time, as long as at least one crop area is able to be independently cropped.

Some embodiments of the invention may provide one or more advantages over prior art systems. For instance, some prior art systems allow for multiple shapes to be drawn on a document, creating a complex and sometimes non-contiguous crop area. A single crop operation then deletes everything outside of those shapes. Systems like these differ from various embodiments of the present invention in a number of ways—the shapes are not independent crop areas, the areas cannot be independently edited, and the exported output is the form of the complex, non-contiguous shape. Various embodiments of the present invention allow for independent crop areas that can be edited and cropped separately. Further, the output of multiple, independent crop operations is multiple art pieces shaped as their respective crop areas, thereby giving a user more flexibility. It should be noted, though, that embodiments of the present invention can be included alongside such prior art solutions in some systems.

In another example, the user can create several versions of the same art on the document—a "scratch pad." The user may not be sure at the time which of the various versions will be used in a final product, but the user desires to keep them in one file for convenience. When the user is working on the document, the user can create separate crop areas around versions of interest and can easily switch between them and export them to different files for an end use. This can be an advantage especially for users who work several times a day with several versions of the same art.

When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like). In fact, readable media can include any medium that can store or transfer information.

Figure 6:
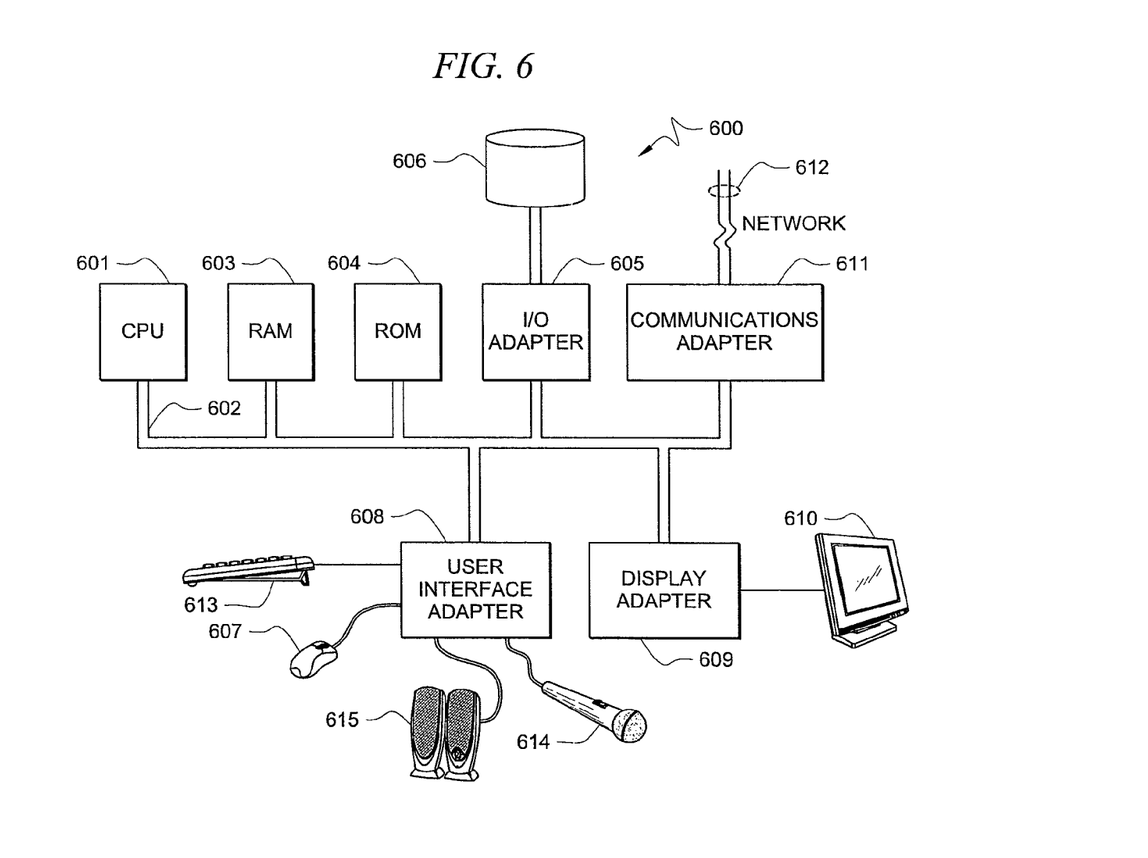
FIG. 6 illustrates an exemplary computer system adapted according to one embodiment of the present invention.

FIG. 6 illustrates exemplary computer system 600 adapted according to one embodiment of the present invention. That is, computer system 600 comprises an example system on which embodiments of the present invention may be implemented (e.g., such as a computer used by an artist in creating artwork for export or a computer running a video program, print program, or other program to make use of exported artwork). Central processing unit (CPU) 601 is coupled to system bus 602. CPU 601 may be any general purpose CPU. However, the present invention is not restricted by the architecture of CPU 601 as long as CPU 601 supports the inventive operations as described herein. CPU 601 may execute the various logical instructions according to embodiments of the present invention to perform, e.g., method 500 (FIG. 5).

Computer system 600 also preferably includes random access memory (RAM) 603, which may be SRAM, DRAM, SDRAM, or the like. Computer system 600 preferably includes read-only memory (ROM) 604 which may be PROM, EPROM, EEPROM, or the like. RAM 603 and ROM 604 hold user and system data and programs, including, for example, documents that include artwork.

Computer system 600 also preferably includes input/output (I/O) adapter 605, communications adapter 611, user interface adapter 608, and display adapter 609. I/O adapter 605, user interface adapter 608, and/or communications adapter 611 may, in certain embodiments, enable a user to interact with computer system 600 in order to input information, such as crop area selection, as with computer pointing device 607. In addition, it may allow for the output of data, as with speakers 615 and monitor 610.

I/O adapter 605 preferably connects to storage device(s) 606, such as one or more of hard drive, compact disc (CD) drive, floppy disk drive, tape drive, etc. to computer system 600. The storage devices may be utilized when RAM 603 is insufficient for the memory requirements associated with storing data for applications. Communications adapter 611 is preferably adapted to couple computer system 600 to network 612 (for example, the Internet, a Local Area Network (LAN), Wide Area Network (WAN), Public Switched Telephone Network (PSTN), cellular network, and the like). User interface adapter 608 couples user input devices, such as keyboard 613, pointing device 607, and microphone 614 and/or output devices, such as speaker(s) 615 to computer system 600. Display adapter 609 is driven by CPU 601 to control the display on display device 610 to, for example, display the user interface with crop areas (as in FIGS. 1-4) of embodiments of the present invention.

It shall be appreciated that the present invention is not limited to the architecture of system 600. For example, any suitable processor-based device may be utilized, including without limitation personal computers, laptop computers, handheld computing devices, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer program product having a non-transitory computer readable storage medium having computer program logic recorded thereon, said computer program product comprising:
    code, when executed by a computer, displaying a graphical document comprising a piece of artwork in an interactive user interface;
    code, when executed by a computer, generating a plurality of crop areas on said document, wherein the plurality of crop areas comprise different sub areas of the piece of artwork, wherein a first crop area of the plurality of crop areas and a second crop area of the plurality of crop areas comprise a same portion of the piece of artwork;
    code, when executed by a computer, receiving first input specifying a first crop operation with regard to the first crop area;
    code, when executed by a computer, cropping the piece of artwork in the first crop area independently of the second crop area in response to the first input;
    code, when executed by a computer, receiving second input specifying a second crop operation with regard to the second crop area; and
    code, when executed by a computer, cropping the piece of artwork in the second crop area independently of the first crop area in response to the second input.

2. The computer program product of claim 1 further comprising:
    code, when executed by a computer, displaying said plurality of crop areas on said document;
    code, when executed by a computer, hiding unselected crop areas.

3. The computer program logic of claim 1 further comprising:
    code, when executed by a computer, rendering indices on each of said crop areas.

4. The computer program logic of claim 3 further comprising:
    code, when executed by a computer, displaying a second user interface identifying said crop areas by their respective indices.

5. The computer program product of claim 3 wherein stored properties associated with a crop area specify a sub area of the piece of artwork by identifying a position and dimensions, wherein the stored properties further comprise a pixel aspect ratio for the crop area.

6. The computer program product of claim 1 wherein cropping the piece of artwork in the first crop area is non-destructive and comprises exporting or saving an area inside the first crop area.

7. A method comprising:
    displaying a user interface, said user interface including a document comprising a piece of artwork;
    creating a plurality of crop area objects on said document, wherein crop area objects comprise different sub areas of the piece of artwork, wherein a first sub area of a first crop area object and a second sub area of a second crop area object comprise a same portion of the piece of artwork;
    receiving a selection of the first crop area object;
    performing a crop operation on the piece of artwork in the first sub area of the first crop area object without regard to others of said crop area objects;
    receiving a selection of the second crop area object; and
    performing a crop operation on the piece of artwork in the second sub area of the second crop area object without regard to others of said crop area objects.

8. The method of claim 7 wherein the first crop area object and the second crop area object correspond to different output formats.

9. The method of claim 7 further comprising:
    exporting said one of said crop area objects in response to said crop operation.

10. The method of claim 7 wherein each of said crop area objects are independently croppable.

11. The method of claim 7 further comprising:
    in response to input, displaying said crop area objects on said document; and
    in response to other input, hiding crop area objects other than said selected one.

12. The method of claim 7 wherein said receiving a selection comprises:
    displaying a second interface identifying said crop area objects by an index;
    receiving input indicating selection of said one of said crop area objects in said second interface.

13. The method of claim 12 wherein said second interface comprises a item selected from the list consisting of:
    a pull-down menu;
    a pop-up print dialog; and
    a pop-up export dialog.

14. The method of claim 7 wherein stored properties associated with a crop area object specify a sub area of the piece of artwork by identifying a position and dimensions, wherein the stored properties further comprise a pixel aspect ratio for the crop area object.

* * * * *

UNITED STATES PATENT AND TRADEMARK OFFICE
CERTIFICATE OF CORRECTION

PATENT NO. : 8,875,010 B1  
APPLICATION NO. : 12/898766  
DATED : October 28, 2014  
INVENTOR(S) : Dimcho Balev Page 1 of 1

It is certified that error appears in the above-identified patent and that said Letters Patent is hereby corrected as shown below:

On the Title Page:

Below the paragraph beginning with Item "(22) Filed: October 6, 2010" insert the following paragraph:

--(65) Prior Publication Data

US 2014/0304595 A1   Oct. 9, 2014--

Signed and Sealed this
Twenty-first Day of April, 2015

Michelle K. Lee
*Director of the United States Patent and Trademark Office*